Patented Dec. 27, 1938

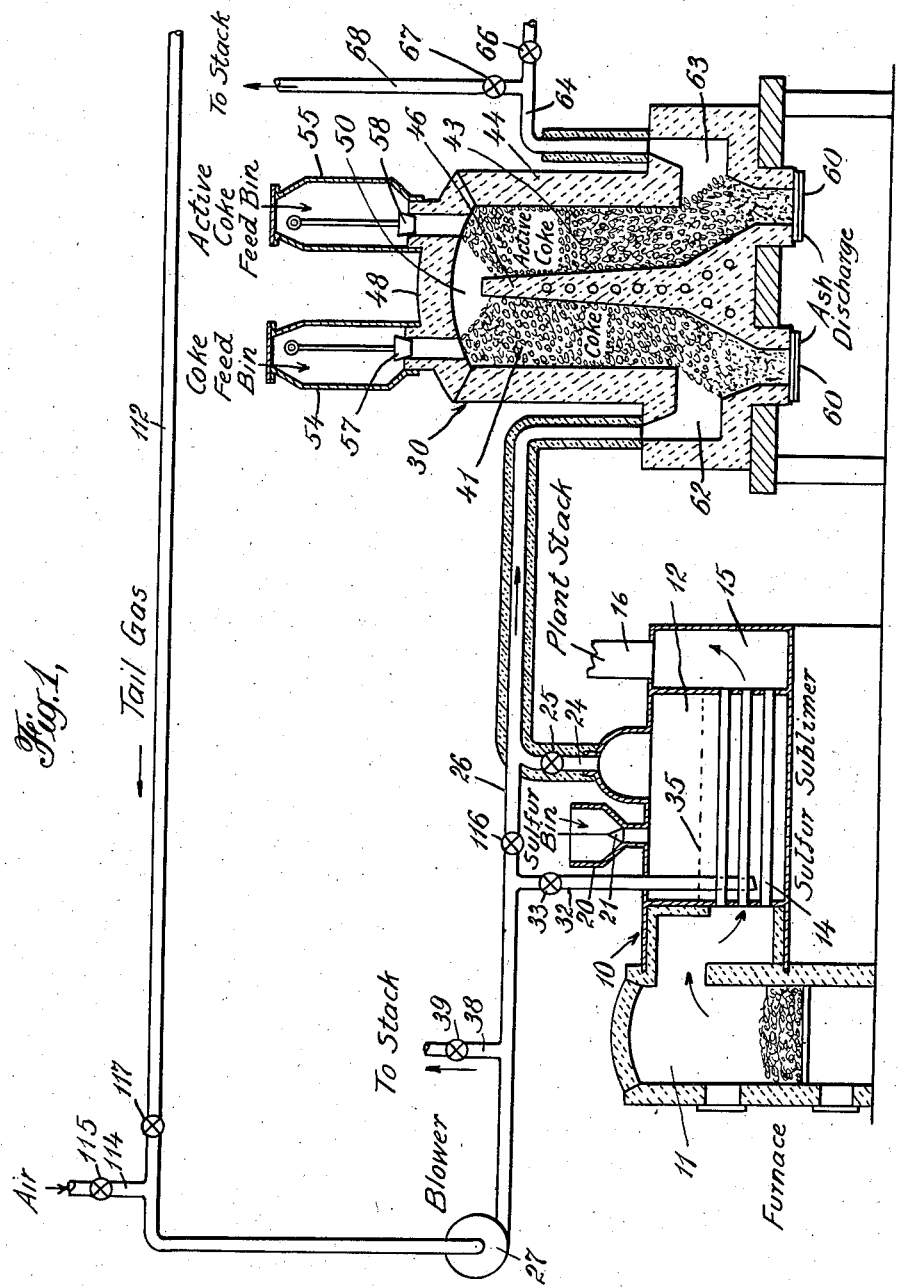

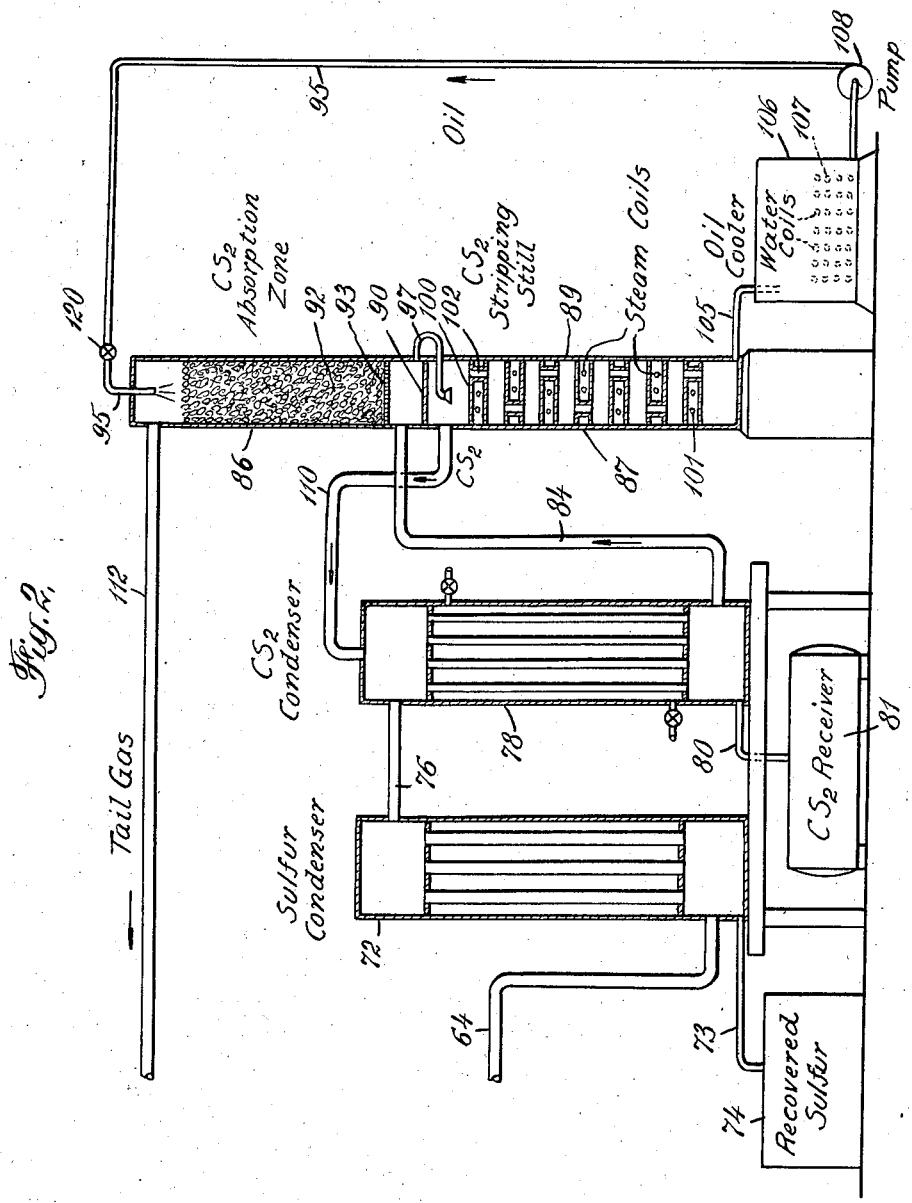

2,141,758

UNITED STATES PATENT OFFICE 2,141,758

MANUFACTURE OF CARBON BISULPHIDE

Henry F. Merriam, West Orange, N. J., assignor to General Chemical Company, New York, N. Y., a corporation of New York Application October 20, 1937, Serial No. 169,967

6 Claims. (Cl. 23—206)

This invention relates to the manufacture of carbon bisulphide and is more particularly directed to production of carbon bisulphide by reacting sulphur in the form of vapor with solid carbonaceous material.

Production of carbon bisulphide by reacting sulphur with carbon has been proposed. In commercial practice, however, only certain types of solid carbonaceous material may be used because, as is well known in the art, all forms of carbon are not sufficiently active to combine economically with sulphur. Metallurgical coke is an example of an insufficiently active form of carbon. The carbonaceous material largely used in commercial practice is wood charcoal, a relatively expensive material. Acid sludges constituting waste products of hydrocarbon oil refining processes in which sulphuric acid is used may be decomposed by heating to produce relatively large amounts of sulphur dioxide gas and substantial quantities of solid carbonaceous coke-like residues. It has recently been found that such acid sludge coke, when containing little or no volatile matter, is a particularly active type of carbonaceous material and may also be used to substantial commercial advantage as a source of carbon in the manufacture of carbon bisulphide. On account of the relative scarcity of carbonaceous materials suitable for use in the manufacture of carbon bisulphide, it will be appreciated such materials demand a premium on the market.

In the past, carbon bisulphide has been commonly produced by reacting sulphur vapor and wood charcoal at high temperatures, e. g., around 1450–1650° F., in externally heated pots or retorts. Such retorts are pear-shaped and small, being generally not more than about 30 inches in diameter. It has been impractical to make the retorts much larger because the high external temperatures required to force the necessary heat to the center of the reaction mass would be prohibitive. The retorts have been made of cast iron and are relatively short-lived on account of the deteriotating effects of the high temperatures externally applied and the corrosive effects of sulphur and carbon bisulphide produced. Furthermore, large numbers of such retorts are required to obtain production of carbon bisulphide in commercial quantities. Consequently, installation and maintenance costs are high, retort replacements constituting a large item of operating costs. Regardless of the form in which sulphur is introduced, whether as sulphur vapor or sulphur dioxide, supply of heat to the reaction is a problem always confronting the operator.

Recognizing the disadvantages encountered in the manufacture of carbon bisulphide in a large number of small retorts, such as just described, it has been proposed to carry out the reaction in larger retorts. In such procedure, oxygen is introduced into the reaction zone along with the sulphurous gas, and the amount of oxygen is controlled so as to support combustion of a sufficient amount of the carbon in the retort to generate heat necessary to maintain the reaction. The principal disadvantages inherent in such prior proposals are (1) consumption in the retort of a large amount of the relatively expensive carbon, e. g., wood charcoal, for purpose other than combination with sulphur, and (2) production of relatively large quantities of carbon oxysulphide, formation of which is substantially promoted by the presence of the oxygen of the air introduced into the system primarily to support combustion of carbon for heat generation. In the manufacture of carbon bisulphide, production of carbon oxysulphide is a troublesome feature and something to be avoided as much as possible on account of sulphur loss as COS and corresponding reduction of $CS_2$ yields.

One of the principal objects of the invention is to provide a process in which the $CS_2$ forming reaction may be carried out in a large retort, and in which process the heat necessary is supplied internally of the reaction zone but is furnished in such a way as to avoid any appreciable consumption, for heat generating purposes, of the expensive carbonaceous material used for carbon bisulphide production. To this end the invention aims to provide a method by which the heat necessary to maintain the endothermic $CS_2$ forming reaction and to offset radiation losses may be supplied first by introducing sulphur into the system in the form of sulphur vapor, and second by burning a relatively cheap form of fuel, e. g. metallurgical coke, in a suitable gas producer or generator to form a bed of incandescent coke, and then passing the sulphur vapor through the incandescent coke to further heat the sulphur vapor to temperatures at least as high as optimum carbon bisulphide forming reaction temperature, prior to introduction of the sulphur vapor into the $CS_2$ forming reaction zone. A large portion of the heat needed to effect combination of sulphur and carbon is required to convert the sulphur used from the solid to the vapor form. Accordingly, in the present process, a large part of the heat needed to maintain the endothermic $CS_2$ forming reaction is brought into the system as heat of the sulphur vapor. Burning, e. g. by air-blasting, of the cheap fuel in the gas producer is regulated and continued for a time interval sufficient to form a bed of hot coke of size and temperature such that on passage of the incoming stream of sulphur vapor through the bed, such vapor is heated to temperatures sufficiently high that on contacting the vapor with an active solid carbonaceous material, e. g. charcoal, sufficient heat is present to effect formation of carbon bisulphide. For example, such combustion is continued and regulated until there is formed in the producer a deep bed of incandescent coke at temperatures upward of about 2200° F. and preferably about 2500° F. or higher, i. e. substantially in excess of the temperatures required to effect combination of sulphur and carbon to produce carbon bisulphide. At the end of the air-blasting cycle, air supplied to the producer is shut off and the sulphur vapor, constituting the source of sulphur in the $CS_2$ forming reaction, is passed through the bed of incandescent coke in the producer at a rate preferably such that while passing through the hot coke the sulphurous gas stream becomes heated to temperatures several hundred degrees in excess of the temperature necessary to effect combination of carbon and sulphur to form carbon bisulphide. The highly heated sulphur vapor is then introduced into a reaction chamber containing a body of carbon sufficiently active to combine with sulphur to form carbon bisulphide at the temperatures usually employed in $CS_2$ production. By so proceeding, the heat needed to maintain the $CS_2$ forming reaction is brought into the reaction zone as heat of sulphur vapor and further quantities of heat added to the sulphur vapors by passing the same through the bed of incandescent metallurgical coke. The invention thus makes possible (1) internal supply of heat to the reaction zone by combustion of cheap forms of fuel and without consumption of expensive reactive form of carbon for generating heat, (2) avoidance of excessive COS formation with consequent high sulphur losses, and (3) use of a large cheaply built and maintained reaction retort without consumption of expensive active carbon for purposes of heat generation. Another object of the invention is to provide a method by which advantageous use may be made of the tail gases of the $CS_2$ recovery system following the $CS_2$ forming reaction zone.

The nature of the invention, the details, objects and advantages thereof may be more fully understood from a consideration of the following description taken in connection with the accompanying drawings, in which Fig. 1 illustrates, partly in section and partly diagrammatic, a portion of a plant lay-out in which one embodiment of the process of the invention may be carried out, and Fig. 2 similarly illustrates the second portion of the plant lay-out.

Referring to Fig. 1 of the drawings, 10 indicates generally a sulphur sublimer comprising a furnace 11, and a chamber 12 adapted to contain a body of molten sulphur. Hot gases from furnace 11 flow through fire-tubes 14, immersed in molten sulphur, into header 15 and thence to spent gas stack 16. The sublimer is provided on top with a bin 20 equipped with any suitable type valve 21 by means of which sulphur may be continuously or intermittently charged into chamber 12 without escape of sulphur vapor.

Vapor formed in the sublimer flows through pipe 24, controlled by valve 25, into conduit 26 one end of which is connected with the pressure side of blower 27, the opposite end opening into a furnace indicated generally by reference numeral 30. Piping between the sublimer and furnace 30 may be covered with insulation to reduce heat loss and deposition of sulphur. A pipe 32, having a control valve 33, communicates at one end with conduit 26, projects into chamber 12, and terminates at a point well below the level of molten sulphur indicated by dotted line 35. A vent pipe 38, controlled by valve 39, provides for discharge to the atmosphere of some of the tail gases in the system.

Furnace 30, which may be circular in horizontal cross-section, is constructed so as to comprise what may be designated a gas producer section 41 and a $CS_2$ forming reaction chamber 43, such sections being formed by the outer circular furnace wall 44 and a diametrically extending vertical partition 46 terminating short of the furnace crown 48 to form a passage 50 affording communication between the upper ends of producer section 41 and reaction zone 43. Furnace 30 is provided with hopper bins 54 and 55 equipped with valves 57 and 58 of any suitable design by means of which solid carbonaceous material may be introduced into producer section 41 and reaction zone 43 without permitting gas escape. Ash may be discharged from sections 41 and 43 through gates 60.

Gases from conduit 26 enter a chamber 62 in the bottom of gas producer section 41, and reaction gases are discharged from furnace 30 through chamber 63 into conduit 64 shown partly in Fig. 1 and partly in Fig. 2. By regulation of valve 66 in pipe 64 and valve 67 (Fig. 1) gases may be discharged from the system through vent pipe 68.

Exit gases and vapors of furnace 30 flow through pipe 64 into the bottom of sulphur condenser 72 which may be either air or water cooled, and liquid sulphur is discharged from the condenser through pipe 73 into a reservoir 74. Cooled exit gases of condenser 72 flow through conduit 76 into the upper end of a $CS_2$ condenser 78, preferably water cooled. Carbon bisulphide liquefied in condenser 78 runs through pipe 80 into receiver 81. Uncondensed gases and vapors leaving the lower end of condenser 78 are fed by pipe 84 into the lower end of $CS_2$ absorption section 86 of tower 87. Section 86 is separated from a $CS_2$ stripping still 89 in the lower end of tower 87 by an imperforate partition 90. Absorption zone 86 may be filled with suitable packing 92, supported by grille 93, and absorbing oil is introduced into the top of zone 86 by pipe 95. Effluent oil of zone 86, containing absorbed $CS_2$, runs through pipe 97 into the top of stripping still 89. As indicated on the drawings, the stripping still section may include a plurality of shelves or chambers 100 each provided with steam coils 101 and an opening 102 through which liquid falls to the next lower shelf. Stripped oil runs out of the bottom of the tower through pipe 105 into oil cooler 106 provided with water cooling coils 107. Cooled oil is then fed by pump 108 through pipe 95 into the top of absorption section 86. Carbon bisulphide vapors vaporized out of the absorbing oil in still 89 are returned by pipe 110 to the top of $CS_2$ condenser 88.

Stripped gases discharged from the top of absorption section 86 flow through conduit 112 (shown partly on Fig. 2 and partly on Fig. 1) to the inlet side of blower 27. Air may be drawn into conduit 112 on the suction side of blower 27 through pipe 114, controlled by valve 115.

In practicing the process of the invention, producer gas section 41 of furnace 30 is substantially filled to near the top of partition 46 with relatively low-priced solid carbonaceous material such as metallurgical coke. It is preferred to employ carbonaceous material containing little or no hydrocarbons since the presence of hydrogen in the coke tends to give rise to the presence of hydrogen in the subsequent $CS_2$ reaction with attendant increase in production of $H_2S$.

Carbon bisulphide forming reaction zone 43 is substantially filled with a body of solid carbonaceous material of the type sufficiently active for use in the manufacture of carbon bisulphide. Wood charcoal is a suitable material. Another sufficiently active type of carbonaceous material is acid sludge coke. Acid sludges may be destructively decomposed by externally heating in a suitable retort, the exit gas mixture of such retort comprising principally sulphur dioxide and water vapor, and smaller amounts of carbon dioxide and hydrocarbon vapors. The acid sludge coke referred to herein constitutes the solid carbonaceous residue remaining in the retort after destructive decomposition of acid sludge. Sludge coke resulting from low temperature destructive decomposition of acid sludges usually contains a large amount, for example 30-40% of volatile matter, comprising chiefly hydrocarbons. Such volatile matter may be driven off by heating at relatively high temperatures, e. g. 1200-1600° F. for a substantial period of time, say from 2 to 6 hours. Acid sludge coke if employed in the present process should contain substantially no and in any event not more than about 3% volatile matter.

Valve 25 in sublimer outlet pipe 24 and valve 33 in pipe 32 are closed and sublimer chamber 12 is charged with sulphur from bin 20. The fire in furnace 11 is started and thereafter controlled so as to maintain in chamber 12 a body of molten sulphur at subliming temperatures. Valves 66 in pipe 64, valve 117 in tail gas conduit 112 (Fig. 1) and valve 39 in vent pipe 38 are closed, valve 67 in discharge pipe 68, valve 116 in conduit 26, and valve 115 in air inlet pipe 114 are opened, and blower 27 is put into operation.

After initial ignition of the metallurgical coke in gas producer section 41, the quantity of air charged into section 41 by blower 27 and the depth of the bed of coke is regulated so that the coke is burned so as to produce a hot mixture comprising chiefly CO and nitrogen. While air-blasting producer section 41, preferably care should be taken so as to form a $CO-N_2$ gas containing as little $CO_1$ as practicable so as to avoid possible consumption of expensive active carbon in section 43 in reducing such $CO_2$ to CO when the exit gas of producer section 41 is subsequently passed through such active carbon.

Generally speaking, air-blasting of producer gas section 41 is carried on in substantially the same way as in well-known gas producer practice except it is desirable to avoid use of steam so as to obtain higher temperatures, and avoid as far as practicable presence of hydrogen and oxygen in the system. Air-blasting of the deep bed of metallurgical coke in section 41 is continued until there is formed a large bed of coke at temperatures such that when passing a stream of sulphur vapor through the bed such vapor is heated to temperatures sufficiently high that on contacting the so heated sulphur vapor with active carbon sufficient heat is present to effect formation of $CS_2$. Preferably, air-blasting is continued until there is obtained in the producer section 41 a deep bed of incandescent coke heated to temperatures of say 2200-2500° F. and upwards. The hot $CO-N_2$ gas formed in section 41 during air-blasting, at temperatures of say 2200-2500° F., flows through connection 50 and thence downwardly through the deep bed of active coke in chamber 43. Since valve 66 in pipe 64 is closed and valve 67 in vent pipe 68 is opened, the spent gases may be discharged to the atmosphere or, since these gases contain substantial amounts of CO having substantial heat generating capacity, such gases may be burned any place about the plant as in furnace 20 11. Since the active carbon in chamber 43 may be rather fine-grained and impose considerable resistance during the heating up cycle when gas flow through the apparatus is relatively high, it may be desirable to vent some portion of the $CO-N_2$ exit gas of chamber 41 through a pipe connection (not shown) in the top of furnace 30. By the time air-blasting of the coke in producer section 41 has been continued until the temperature of the coke bed of the producer is around 2500° F. or higher, the active coke in reaction chamber 43 has become heated up to temperatures of the order of 1500-1600° F., in the neighborhood of carbon bisulphide production temperature. The process may now be taken off the air-blasting cycle and switched over to the carbon bisulphide production or "make" cycle.

Valve 115 in air inlet pipe 114, valve 116 in conduit 26, and valve 67 in vapor pipe 68 are closed, and valve 117 in tail gas line 112, valve 33 in pipe 32, valve 25 in sublimer outlet pipe 24, and valve 66 in $CS_2$ vapor pipe 64 are opened. After the carbon bisulphide production cycle is under way, the $CS_2$ absorption zone tail gases, which may contain by volume about 50% $N_2$ and 50% COS and $H_2S$, are drawn by blower 27 through pipe 112 and into conduit 26. According to one feature of the invention, a portion of the tail gas is utilized to carry sulphur vapor from the sublimer into furnace 30. In normal operations around 20% of the tail gas may be employed for this purpose, and accordingly valve 33 in pipe 32 (leading into the sublimer) and valve 39 in vent pipe 38 are adjusted so as to effect introduction into sublimer chamber 12 of say approximately 20% of the total volume of tail gas. Temperatures of 700-800° F. should be maintained in chamber 12, and the fire gases from furnace 11 are controlled accordingly. The amount of tail gases introduced into the sublimer through pipe 32 are such that the gas leaving sublimer chamber 12 through exit pipe 24 comprises by volume roughly 50% sulphur vapor and 50% inert tail gas. Use of a portion of the tail gas, as described affords the material advantage of rapidly and smoothly feeding to the reaction zone a gas stream of fairly constant volume and composition. Accordingly, a mixture of sulphur vapor and tail gas flows through conduit 26 and enters chamber 62 in the bottom of producer section 41, at temperatures of around 750-760° F. One important feature of the improved process is use of vaporized sulphur. In the manufacture of $CS_2$ from elemental sulphur, a large portion, say about half, of the total amount of heat required to effect combination of sulphur and active carbon is needed to melt and vaporize the sulphur. In the present process the heat necessary to melt and vaporize the sulphur may be obtained by burning the cheapest kind of fuel in furnace 11. The process has the advantage of supplying a large portion of the total heat requirement at relatively low temperatures of say 750-800° F. rather than at high temperatures of about 1600° F. which is the case when solid or molten sulphur is introduced directly into the $CS_2$ forming reaction zone. Furthermore, by bringing into the system a large part of the heat required in the form of sulphur vapor, less heat absorption takes place in the $CS_2$ forming reaction zone, thereby substantially increasing the length of the $CS_2$ production cycle.

The sulphur vapor is flowed upwardly through the hot coke bed at a rate controlled so that the vapor becomes highly heated to temperatures several hundred degrees in excess of that necessary to effect combination of sulphur and carbon to form carbon bisulphide. For example, sulphur vapor may be withdrawn from producer section 41 at temperatures above 1600° F. and usually around 2000° F. or higher, especially at the beginning of the carbon bisulphide production cycle. Although the metallurgical coke is insufficiently active to effect any appreciable commercial production, some $CS_2$ may be formed. However, any reducible compounds, such as $SO_2$, $H_2O$ and $CO_2$ which may possibly be present in small amounts in the incoming sulphur vapor stream are reduced in section 41, thus avoiding consumption for this purpose of expensive active carbon in reaction zone 43.

At the beginning of the carbon bisulphide production cycle, the temperature of the sulphur vapor introduced into the top of reaction zone 43 is at a maximum, e. g. of the order of 2000° F. or above and is hence considerably in excess of the optimum temperatures for carbon bisulphide production. The sulphur vapor entering the top of reaction chamber 43 at initial maximum temperature first imparts substantial quantities of heat to the upper layers of carbon and on continued downward passage gradually becomes cooled to the temperature range at which best yield of carbon bisulphide may be obtained. Indications are that most satisfactory production of carbon bisulphide is obtained at temperatures generally of the order of 1460-1560° F. A deep bed of active carbon is maintained in reaction chamber 43 for the purpose of providing a reservoir for substantial quantities of heat. The depth of the bed of carbon in chamber 43 is maintained such that no matter how high may be the temperatures of the sulphurous gas at the point of first contact with carbon, the bed is of sufficient depth so that some place below the top of the bed there exists a zone of substantial size in which optimum $CS_2$ production temperatures prevail. As the reaction proceeds, the temperature of the incoming sulphur vapor decreases and the sulphur vapor begins to reabsorb heat from the upper layers of hot carbon in the reaction chamber. Hence, as the $CS_2$ production cycle progresses, the zone of optimum reaction temperature in the coke in reaction chamber 43 rises and approaches the top of the bed. Temperatures in different parts of the carbon bed in the reaction chamber may be determined by suitable means, and when the temperature in the upper layers of the coke decreases to say 1500° F., the system is ready to be taken off $CS_2$ production and switched back to the air-blasting cycle.

The reaction gas mixture leaving chamber 43 comprises $CS_2$ vapor, some CO and $H_2S$, nitrogen (left in the system in the coke beds after air-blasting), an appreciable amount of COS, and possibly a small quantity of $CO_2$.

The gases leaving reaction chamber 43 are carried by pipe 64 into the lower end of sulphur condenser 72 which is air or otherwise cooled so that the exit gases of the condenser enter pipe 76 at temperatures of about 250° F. If desired, a waste heat boiler, not shown, may be interposed between reaction chamber 43 and condenser 72, and some of the heat contained in the reaction gases thus recovered in the form of steam. During cooling in condenser 72, whatever small quantities of sulphur may be contained in the reaction gases are liquefied, collect in the bottom of condenser 72, and flow thence through pipe 73 into receiver 74.

Condenser 78 is operated so as to effect cooling of the vapors and gases to around 80-100° F. Condenser 78 may be desirably refrigerated so as to effect liquefaction of maximum quantities of carbon bisulphide which flows out of the condenser through pipe 80 into carbon bisulphide receiver 81. Exit gases of condenser 78 flow through pipe 84 into the bottom of absorption zone 86. Any suitable oil, e. g. a hydrocarbon oil such as straw oil, adapted to absorb $CS_2$, may be introduced into the top of the absorption zone from pipe 95, and rate of downflow of oil is controlled by a suitable valve 120 so as to effect absorption of substantially all of the $CS_2$ contained in the upwardly flowing gases. Proper rate of flow of oil through the absorption zone may be readily determined to suit any particular set of operating conditions. In this way, substantially all of the $CS_2$ of the gas stream becomes absorbed in the oil and is thus separated from the remaining relatively inert reaction gases which are discharged from the absorption zone into tail gas conduit 112.

The effluent oil of absorption zone 86, containing absorbed $CS_2$, runs through pipe 97 into $CS_2$ stripping still 89. Steam may be circulated through steam coils 101 so as to maintain temperatures of approximately 212° F. in the stripping zone. Carbon bisulphide vapors liberated flow through pipe 110 back into the top of condenser 78. Stripped oil runs from the bottom of still 89 into cooler 106 in which the oil is cooled to about 100° F. and is returned by pump 108 to the top of absorption zone 86.

During the carbon bisulphide production cycle, tail gases (conduit 112) which may consist by volume of approximately 50% nitrogen and 50% COS and $H_2S$ are utilized in sulphur sublimer 10 or vented to the atmosphere through pipe 38 as previously described.

Temperatures of different parts of the carbon bed in reaction chamber 43 may be determined by any suitable means, and when the temperature in the upper layer of the carbon decreases to about 1500° F. the system should then be taken off $CS_2$ production and switched back to the air-blasting cycle. At this point, valve 25 in sublimer outlet pipe 24 and valve 33 in pipe 32 is closed, thus stopping off introduction of further quantities of sulphur vapor into the reaction zone. Certain quantities of carbon disulphide and unreacted sulphur remain in the coke beds in chambers 41 and 43, and in accordance with the invention such amounts of carbon bisulphide and sulphur are purged by means of tail gases. Circulation of tail gases through chambers 41 and 43, the $CS_2$ recovery system shown in Fig. 2 of the drawings, tail gas conduit 112 and conduit 26 is maintained by blower 27 and continued for such a period of time until substantially all of the carbon bisulphide and unreacted sulphur are removed from chambers 41 and 43. In this way the $CS_2$ and sulphur left in the two beds of carbonaceous material is recovered. The system is now ready for repetition of the air-blasting cycle which is then carried out as previously described.

In the appended claims the terms "active carbon," and "active carbonaceous material" are intended to define a type of active carbon such as wood charcoal or acid sludge coke sufficiently active to combine with sulphur to form carbon bisulphide, and substantially free from volatile matter.

I claim:

1. The method for making carbon bisulphide which comprises introducing sulphur into a vaporizing zone, vaporizing sulphur therein, burning solid carbonaceous material to form an initial bed of hot solid carbonaceous material, regulating and continuing combustion of said material for a time interval sufficient to form a bed of hot solid carbonaceous material of size and temperature such that on passage of a stream of sulphur vapor through the bed such vapor is heated to temperatures sufficiently high that on contacting said sulphur vapor with an active carbonaceous material sufficient heat is present to effect formation of carbon bisulphide, discontinuing such combustion operation, passing through said initial bed a stream comprising said sulphur vapor to further heat the same, contacting the thus heated sulphur vapor stream with a body of active solid carbonaceous material to effect combination of sulphur and carbon to form carbon bisulphide, separating carbon bisulphide from residual inert reaction gases, recovering carbon bisulphide, and passing a current of said residual gases into said vaporizing zone and thence into said initial bed of carbonaceous material to thereby smoothly and rapidly introduce sulphur vapor into contact with said carbonaceous material.

2. The method for making carbon bisulphide which comprises introducing sulphur into a vaporizing zone, vaporizing sulphur therein, burning solid carbonaceous material to form an initial bed of hot solid carbonaceous material, regulating and continuing combustion of said material for a time interval sufficient to form a relatively deep bed of incandescent solid carbonaceous material heated to temperatures several hundred degrees in excess of optimum temperatures for effecting combination of sulphur and active carbon to form carbon bisulphide, discontinuing such combustion operation, passing through said initial bed a stream comprising said sulphur vapor at a rate such as to heat the same to temperatures substantially in excess of optimum carbon bisulphide formation temperatures, contacting the thus heated sulphur vapor stream with a body of active solid carbonaceous material of sufficient depth that in a zone of substantial size optimum temperatures for formation of carbon bisulphide prevail, separating carbon bisulphide from residual inert reaction gases, recovering carbon bisulphide, and passing a current of said residual gases into said vaporizing zone and thence into said initial bed of carbonaceous material to thereby smoothly and rapidly introduce sulphur vapor into contact with said carbonaceous material.

3. The method for making carbon bisulphide which comprises introducing sulphur into a vaporizing zone, vaporizing sulphur therein, burning solid carbonaceous material to form a hot carbon monoxide gas and an initial bed of hot solid carbonaceous material, regulating and continuing combustion of said material for a time interval sufficient to form a bed of hot solid carbonaceous material of size and temperature such that on passage of a stream of sulphur vapor through the bed such vapor is heated to temperatures sufficiently high that on contacting said vapor with an active carbonaceous material sufficient heat is present to effect formation of carbon bisulphide, passing said hot carbon monoxide gas during said time interval through a bed of active carbonaceous material to heat the same to temperatures approaching carbon bisulphide formation temperature, discontinuing such combustion operation, passing through said initial bed a stream comprising said sulphur vapor to heat the same, contacting the thus heated vapor stream with said body of active solid carbonaceous material to effect combination of sulphur and carbon to form carbon bisulphide, separating carbon bisulphide from residual inert reaction gases, recovering carbon bisulphide, and passing a current of said residual gases into said vaporizing zone and thence into said initial bed of carbonaceous material to thereby smoothly and rapidly introduce sulphur vapor into contact with said carbonaceous material.

4. The method for making carbon bisulphide which comprises introducing sulphur into a vaporizing zone, vaporizing sulphur therein, burning solid carbonaceous material to form a hot carbon monoxide gas and an initial bed of hot solid carbonaceous material, regulating and continuing combustion of said material for a time interval sufficient to form a relatively deep bed of incandescent solid carbonaceous material heated to temperatures several hundred degrees in excess of optimum temperatures for effecting combination of sulfur and active carbon to form carbon bisulfide, passing said hot carbon monoxide gas during said time interval through a bed of active carbonaceous material to heat the same to temperatures approaching carbon bisulphide formation temperature, discontinuing such combustion operation, passing through said initial bed a stream comprising said sulphur vapor at a rate such as to heat the same to temperatures substantially in excess of optimum carbon bisulphide formation temperature, contacting the thus heated vapor with said body of active solid carbonaceous material of sufficient depth that in a zone of substantial size optimum temperatures for formation of carbon bisulfide prevail, separating carbon bisulfide from residual inert gases, recovering carbon bisulphide, and passing a current of said residual gases into said vaporizing zone and thence into said initial bed of carbonaceous material to thereby smoothly and rapidly introduce sulphur vapor into contact with said carbonaceous material.

5. The method for making carbon bisulfide which comprises air-blasting a body of solid carbonaceous material to form an initial bed of hot solid carbonaceous material, regulating and continuing combustion of said material for a time interval sufficient to form a bed of hot solid carbonaceous material of size and temperature such that on passage of a stream of sulphur vapor through the bed said vapor is heated to temperatures sufficiently high that on contacting said vapor with an active carbonaceous material sufficient heat is present to effect formation of carbon bisulphide, discontinuing such air-blasting operation, passing through said initial bed a stream comprising said sulphur vapor to further heat the same, contacting the thus heated vapor with a body of active solid carbonaceous material to effect combination of sulphur and carbon to form carbon bisulphide, separating carbon bisulphide from residual inert reaction gases, recovering carbon bisulphide, repeating air-blasting after temperature in said body of active carbon has dropped to not less than about optimum carbon bisulphide formation temperature, and prior to each air-blasting passing a current of said inert residual gases through said beds of carbonaceous material to purge the same.

6. The method for making carbon bisulphide which comprises air-blasting a body of solid carbonaceous material to form an initial bed of hot solid carbonaceous material, regulating and continuing combustion of said material for a time interval sufficient to form a relatively deep bed of incandescent solid carbonaceous material heated to temperatures several hundred degrees in excess of optimum temperatures for effecting combination of sulphur and active carbon to form carbon bisulphide, discontinuing such air-blasting operation, passing through said initial bed a stream comprising sulphur vapor at a rate such as to heat the same to temperatures substantially in excess of optimum carbon bisulphide formation temperature, contacting the thus heated vapor with a body of active solid carbonaceous material of sufficient depth that in a zone of substantial size optimum temperatures for formation of carbon bisulphide prevail, separating carbon bisulphide from residual inert reaction gases, recovering carbon bisulphide, repeating air-blasting after temperature in said body of active carbon has dropped to not less than about optimum carbon bisulphide formation temperature, and prior to each air-blasting passing a current of said inert residual gases through said beds of carbonaceous material to purge the same.

HENRY F. MERRIAM.